T. J. STURTEVANT.
MEANS FOR LUBRICATING BEARINGS.
APPLICATION FILED DEC. 4, 1911.
1,130,118.
Patented Mar. 2, 1915.
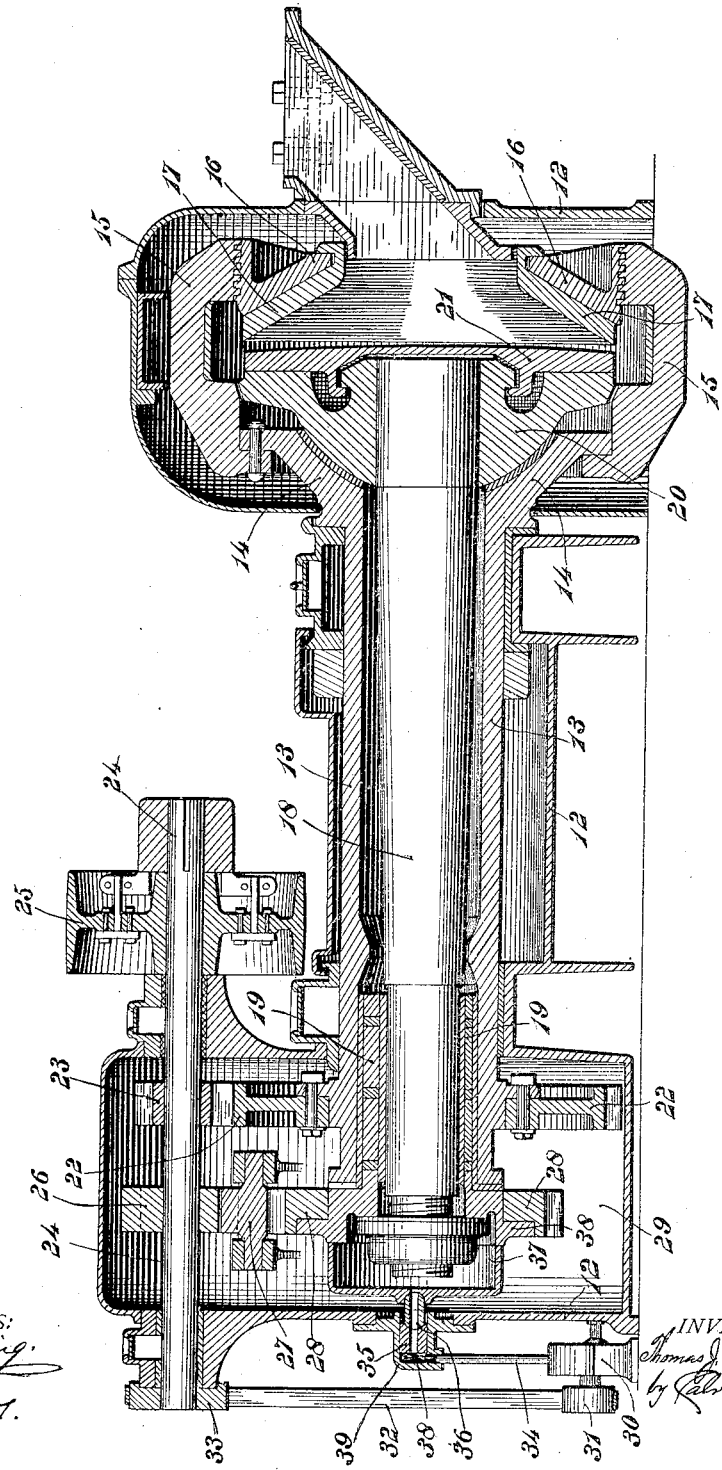
WITNESSES:
INVENTOR:
Thomas J. Sturtevant
Attorneys

UNITED STATES PATENT OFFICE.

THOMAS JOSEPH STURTEVANT, OF WELLESLEY, MASSACHUSETTS, ASSIGNOR TO STURTEVANT MILL COMPANY, A CORPORATION OF MAINE.

MEANS FOR LUBRICATING BEARINGS.

1,130,118.  Specification of Letters Patent.  Patented Mar. 2, 1915.

Original application filed May 16, 1911, Serial No. 627,598. Divided and this application filed December 4, 1911. Serial No. 663,859.

*To all whom it may concern:*

Be it known that I, THOMAS J. STURTEVANT, a citizen of the United States, residing at Wellesley, in the county of Norfolk and State of Massachusetts, have invented or discovered certain new and useful Improvements in Means for Lubricating Bearings, of which the following is a specification, reference being had therein to the accompanying drawing.

This invention relates to a novel construction whereby a bearing interposed between two rotating shafts may be properly lubricated, the invention being more particularly intended for use in connection with a tilting-disk crushing-mill such, for example, as that shown and described in my application No. 627,598, filed May 16, 1911, and of which this application is a division. The invention is, however, adapted for use in other machines in which there may be a bearing difficult of access located between two moving parts so that said bearing will have inner and outer surfaces between which and said parts there is a moving engagement and so that such surfaces require proper lubrication.

The accompanying drawing is a vertical longitudinal section of a crushing mill embodying the present invention.

Referring to the drawing, 12 denotes a suitable framework or support one portion of which is constructed to form a tight casing part. Mounted in suitable bearings in the said frame-work or support is a hollow shaft 13 to the enlarged head portion 14 of which is bolted a spider ring 15 to which is attached, preferably by a screw threaded connection, as shown, a head 16 carrying the outer rotating crushing disk 17.

Inclosed within the hollow shaft 13 is an inner shaft 18 one end of which is journaled in an eccentric bearing 19 which may be held stationary, but which will preferably be rotated in a direction contrary to the direction of rotation of the shafts 13 and 18. In either instance there will be a moving frictional contact between the inner and outer surfaces of the said eccentric bearing and the said shafts. The inner shaft 18 is provided with a head 20 to which is attached, in any suitable manner, the inner crushing disk 21. Owing to the fact that the eccentric bearing 19 maintains the axes of the outer and inner shafts 13 and 18 out of line with each other it results that when the machine is in operation certain parts of the crushing disks 17 and 21 will be constantly approaching each other, while the diametrically opposite parts of said disks will be constantly receding from each other, thereby causing an opening and closing crushing action of said disks as they rotate together, the opening and closing movements of the said crushing disks being more rapid if the eccentric bearing 19 be caused to rotate in a direction opposite to the direction of rotation of the said shafts.

In the form of the machine herein shown the shaft 13 has attached thereto a gear wheel 22 which meshes with a smaller gear wheel 23 mounted on a driving shaft 24 carrying a pulley 25 which may be belted to a power shaft. The shaft 24 also carries a gear wheel 26 which is connected by an idler gear 27 with a gear wheel 28 connected with the eccentric bearing 19, and by virtue of this construction said bearing will be rotated in a direction opposite to the rotation of the shaft 13. The inner shaft 18 will be caused to rotate with the outer shaft 13 by the material being crushed and which is tightly grasped between the crushing disks 17 and 21 so that the said disks and the shafts to which they are attached will be caused to rotate together.

A portion of the frame-work or support 12 is constructed to form a casing part the lower tightly closed portion of which affords a chamber or reservoir 29 adapted to contain oil or any other suitable liquid lubricant. The said chamber 29 communicates with a force pump 30 having a pulley 31 which is connected by a belt 32 with a pulley 33 on the driving shaft 24. The said force pump is connected by a pipe 34 with an oil duct formed in a hollow plug or plunger 35 and a tube 36 the orifice through which opens into the chamber of a cap or cover 37 fitting tightly on the head portion 38 at the outer end of the eccentric bearing 19, and to which head portion the gear wheel 28 is attached. The tube 36 is formed convex at its ends and is seated in concave recesses in the adjacent parts of the plug or plunger 35 and the cap or cover 37, the parts being held together by the spring 38' located in the cap 39 and bearing against the plug or plunger 35. This construction affords a jointed and flexible pipe or tube which can accommodate itself to the movements of the rotating cap or cover 37. The cap or cover 37 affords an oil chamber into which oil may be forced by the force pump 30 from the chamber or reservoir 29, so that the pressure in the chamber of said cap or cover 37 will cause the oil to be forced to the frictional surfaces of the eccentric bearing 19 and through said bearing.

As the level of oil in the chamber 29 will preferably be high enough so that the gears 22 and 28 can dip into the same it is obvious that the gearing shown and the bearings for the driving shaft 24 will be thoroughly lubricated. The waste oil drips from the bearings into the chamber 29 and is returned by the force pump into the chamber of the casing 37, so that the oil can be used over and over again.

From the foregoing it will be apparent that the surfaces of the bearing 19, which is difficult of access and on which great strain comes when the mill is running, will at all times be properly lubricated.

Having thus described my invention I claim and desire to secure by Letters Patent:

1. The combination with inner and outer shafts rotating on axes which are in different planes or out of line with each other, of an eccentric bearing interposed between said shafts, and thus presenting inner and outer surfaces requiring lubrication, an oil chamber at the outer end of said bearing and outwardly closed so as to be adapted to contain oil under pressure, said chamber communicating with the said surfaces of said bearing, an oil reservoir located below said bearing and adapted to receive the waste oil therefrom, and means for forcing oil from said reservoir into said chamber and to said inner and outer surfaces of said bearing.

2. The combination with inner and outer shafts rotating on axes which are in different planes or out of line with each other, of an eccentric bearing interposed between said shafts, and thus presenting inner and outer surfaces requiring lubrication, an oil cap or cover at the outer end of said eccentric bearing and affording an oil chamber which is outwardly closed so as to be adapted to contain oil under pressure, said chamber communicating with the said surfaces of said bearing, and an oil reservoir located below said bearing and adapted to receive the waste oil therefrom, and means for forcing oil from said reservoir into said chamber and to said inner and outer surfaces of said bearing.

3. The combination with inner and outer shafts rotating on axes which are in different planes or out of line with each other, of an eccentric bearing interposed between said shafts, and thus presenting inner and outer surfaces requiring lubrication, an oil cap or cover at the outer end of said eccentric bearing, affording an oil chamber which is outwardly closed so as to be adapted to contain oil under pressure and having a slight wabbling movement when the machine is running, said chamber communicating with the said surfaces of said bearing, and means for forcing oil into said chamber and to the inner and outer surfaces of said bearing, said means consisting of a force pump and a flexible or jointed duct or conduit between said force pump and said cap or cover, said flexible or jointed duct or conduit accommodating the wabbling movements of said oil cap or cover.

4. The combination with the outer and inner shafts 13 and 18, of the eccentric bearing 19 interposed between said shafts, and thus presenting inner and outer surfaces requiring lubrication, a chambered cap or cover 37 at the outer end of said bearing and outwardly closed so as to be adapted to contain oil under pressure, an oil reservoir located below said bearing and which receives the waste oil therefrom, a force-pump, a flexible or jointed tube comprising the parts 35 and 36 between said force pump and said chambered cap or cover, and the spring 38 to hold said parts 35, 36 and 37 together.

In testimony whereof I affix my signature, in presence of two witnesses.

THOMAS JOSEPH STURTEVANT.

Witnesses:
L. H. STURTEVANT,
W. W. COLLES.

Copies of this patent may be obtained for five cents each, by addressing the "Commissioner of Patents, Washington, D. C."